United States Patent [19]

Pinarbasi

[11] Patent Number: 5,591,533
[45] Date of Patent: Jan. 7, 1997

[54] THIN FILM MAGNETIC TRANSDUCER HAVING A STABLE SOFT FILM FOR REDUCING ASYMMETRY VARIATIONS

[75] Inventor: Mustafa Pinarbasi, Morgan Hill, Calif.

[73] Assignee: International Business Machines Corporation, Armonk, N.Y.

[21] Appl. No.: 458,862

[22] Filed: Jun. 1, 1995

Related U.S. Application Data

[62] Division of Ser. No. 167,684, Dec. 14, 1993, abandoned.

[51] Int. Cl.$^6$ ............................ B32B 15/04; G11B 21/00
[52] U.S. Cl. ........................ 428/611; 428/928; 428/632; 428/631; 428/666; 428/667
[58] Field of Search ..................... 428/630, 632, 428/611, 928, 635, 631, 666, 667; 360/113

[56] References Cited

U.S. PATENT DOCUMENTS

| | | | |
|---|---|---|---|
| 4,074,016 | 2/1978 | Trippel | 428/626 |
| 4,124,736 | 11/1978 | Patel et al. | 428/622 |
| 4,670,356 | 6/1987 | Sato et al. | 428/693 |
| 4,753,852 | 6/1988 | Mizukami et al. | 428/651 |
| 4,789,910 | 12/1988 | Otsuka et al. | 360/113 |
| 4,833,020 | 5/1989 | Shiroishi et al. | 428/336 |
| 4,935,311 | 6/1990 | Nakatani | 428/611 |
| 5,049,451 | 4/1991 | Lal et al. | 428/611 |
| 5,147,732 | 9/1992 | Shiroishi et al. | 428/668 |

FOREIGN PATENT DOCUMENTS

| | | | |
|---|---|---|---|
| 0498668A2 | 2/1992 | European Pat. Off. | G11B 5/39 |
| 0565102A2 | 4/1993 | European Pat. Off. | G11B 5/39 |
| 0585009A2 | 8/1993 | European Pat. Off. | G11B 5/39 |
| 2-23681 | 1/1990 | Japan . | |

OTHER PUBLICATIONS

Charles W. Keenan et al., General College Chemistry, Fifth Edition, Harper & Row Publishers, NY, pp. 489–490.

*Primary Examiner*—David A. Simmons
*Assistant Examiner*—Linda L. Gray
*Attorney, Agent, or Firm*—Leslie G. Murray; Paik Saber

[57] ABSTRACT

In a magnetoresistive read transducer, a material which is inert with respect to the soft film magnetic biasing layer is formed at the surface of the substrate prior to soft film deposition. In a preferred embodiment of the present invention, a substrate surface layer of metal such as Cr or Ta is used. These metals have high resistivity due to partial oxidation when deposited on the substrate to reduce shunting of sensing current through the magnetoresistive layer, and further acts as a barrier to protect the soft film from substrate interface contamination. The surface layer also acts as a seed layer to set the soft film magnetization orientation in a well-defined direction therefore reducing magnetic instability.

8 Claims, 1 Drawing Sheet

THIN FILM MAGNETIC TRANSDUCER HAVING A STABLE SOFT FILM FOR REDUCING ASYMMETRY VARIATIONS

This is a divisional of application of application Ser. No. 08/167,684 filed on Dec. 14, 1993, in the name of M. Pinarbasi, now abandoned.

BACKGROUND OF THE INVENTION

1. Field of the Invention

The present invention relates generally to magnetic disk storage systems, and more particularly to magnetoresistive transducers for use in such systems.

2. Description of Related Art

In the magnetic recording industry, increased recording density on magnetic storage media, such as magnetic tapes, disks or the like, places an ever increasing demand on the devices employed to read the recorded information. The read transducers must have greater sensitivity and reduced vulnerability to noise and cross-talk. At the present time, the most likely candidate to meet these requirements appears to be a magnetic read sensor or head which includes a thin film magnetoresistive (MR) element.

In the past, the thin film magnetoresistive read head is formed on a rigid support substrate (which typically includes a top layer of $Al_2O_3$ or $SiO_2$), essentially by layering thin films of a magnetic biasing element (e.g. a magnetically "soft" alloy of NiFeCr, NiFeNb or NiFeRh), a spacer element (e.g. $Al_2O_3$, $SiO_2$) and a magnetoresistive element (e.g. NiFe alloy) in that order onto the substrate. The magnetoresistive element is arranged so that the magnetizing direction in the magnetoresistive element is altered upon receipt of a magnetic field signal that is written in the magnetic storage medium, and the resultant variation of an internal resistance of the magnetoresistive element, in accordance with the variation in the above magnetizing direction, is provided as an external voltage output. The soft film applies a transverse biasing magnetic field to the magnetoresistive element, such that the variation of the magnetizing direction in the magnetoresistive element is centered with reference to the direction of the biasing magnetic field and the variation of the internal resistance of the magnetoresistive element can increase or decrease with reference to the resistance at the biased point.

Proper biasing of the magnetoresistive element is critical for the linear performance of the magnetoresistive transducer. Ideally, the magnetoresistive element should be magnetically biased by the soft film such that its voltage outputs which correspond to the transitions in the magnetic field signal stored in the magnetic storage medium are symmetrical about a reference voltage. However, various factors result in asymmetry of the outputs. One of the factors is the microstructural and magnetic property variations of the soft film at a microscopic level on the wafer. Moreover, the soft film properties are not uniform across the wafer. The presence of residues and contaminants on the wafer surface before soft film deposition enhances the non-uniformities even further. All these result in non-systematic variations in the aforementioned voltage output asymmetry between manufactured magnetoresistive read heads.

The soft film microstructure and composition depends upon the surface chemistry of the underlying wafer surface on which it is deposited. For example, NiFeCr soft film reacts with the underlying $Al_2O_3$ layer. At the contact surface, NiFeCr oxidizes in the presence of the oxide, which can take place during deposition, during subsequent processing which includes repeated annealing steps at elevated temperatures (e.g. 250 degrees C.), and during operational service lifetime due to Joule heating. Unfortunately, the surface chemistry of the wafer layer is not well defined, and is therefore uncontrollable at the atomic level.

To alleviate the above problem, sputter etch cleaning of the substrate is utilized to obtain a fresh surface before the deposition of the soft film alloy. While this approach helps to obtain a cleaner surface, it does not eliminate the problem. It is well known that the components of alloy materials do not in general have the same sputtering yield. Due to this so called "preferential sputtering" of the alloy components, a top active surface layer forms which has a stoichiometry that is different than the rest of the film and not necessarily uniform across the wafer. Longer sputter etch times to clean contaminants and to reach an equilibrium surface chemistry is not possible since this potentially induces electrical shorts through the substrate.

It has been experienced that while the soft film and magnetoresistive element thicknesses can be controlled to within 2 to 3 percent on a given wafer during deposition, variation in the voltage output asymmetry between wafers is usually 5 to 10 times higher than the wafer level thickness control. This results in a significant yield loss for the production of the magnetoresistive heads.

SUMMARY OF THE INVENTION

It is therefore the principal object of the present invention to provide a well defined inert surface prior to the deposition of the alloy layer (either a soft magnetic film or magnetoresistive layer) to avoid local variations in the alloy chemical and physical properties, and thereby to reduce the variation in asymmetry in the voltage outputs of the manufactured magnetoresistive heads.

In accordance with the principles of the present invention, the substrate is provided with a surface layer of material characterized as being substantially inert with respect to the overlaying alloy layer. In a preferred embodiment of the present invention, a substrate surface layer of metal such as Cr or Ta is deposited prior to depositing the alloy layer. These metals after deposition have high resistivity due to partial oxidation when formed on the substrate, which reduces shunting of the sense current in the magnetoresistive element and further acts as a barrier to protect the alloy from interface contamination. This metal layer can also act as a 'seed' layer to set the soft film magnetization orientation in a well-defined direction, thereby reducing magnetic instability.

BRIEF DESCRIPTION OF THE DRAWING

The foregoing and other objects, features and advantages of the present invention will be apparent from the following detailed description of the preferred embodiments of the invention, reference being made to the accompanying drawing, in which like reference numerals indicate like parts and in which.

DESCRIPTION OF THE PREFERRED EMBODIMENT

The present description is made for the purpose of illustrating the general principles of the invention and should not be taken in a limiting sense. The scope of the invention is best determined by the claims appended hereto.

Figure 1:
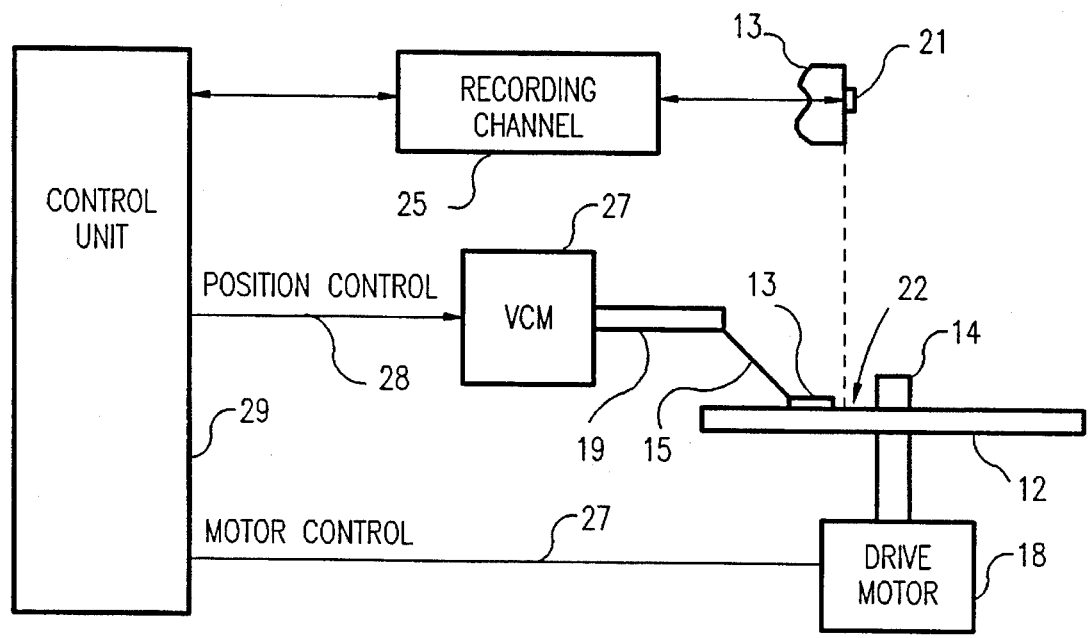
FIG. 1 is a simplified block diagram of a magnetic disk storage system embodying the present invention.

Although the present invention is described as embodied in a magnetic disk storage system as shown in FIG. 1, it will be apparent that the invention is also applicable to other magnetic recording systems such as a magnetic tape recording system, for example. Referring to FIG. 1, at least one rotatable magnetic disk 12 is supported on a spindle 14 and rotated by a disk drive motor 18. The magnetic recording is in the form of an annular pattern of concentric data tracks (not shown) on surface 22 of the disk 12.

At least one slider 13 is positioned on the disk 12, each slider 13 supporting one or more magnetic read/write heads 21. As the disk rotates, the slider 13 is moved radially in and out so that the heads 21 may access different portions of the disk surface 22 containing the data. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means shown in FIG. 1 is a voice coil motor (VCM). The VCM is a coil moveable within a fixed magnetic field, and the direction and velocity of the coil movements are controlled by the current supplied by the control unit 29. Other kinds of actuators may be used instead.

The various components of the disk storage system are controlled in operation by signals generated by control unit 29, such as access control signals and internal clock signals, and which includes logic control circuits, storage means and a microprocessor. The control unit 29 generates control signals to control various system operations such as motor control signals on line 23 and head position control signals on line 28. The control signals on line 28 provide the desired current profiles to optimally move and position a selected slider 13 to the desired data track on the associated disk 12. Read and write signals are communicated to and from read/write heads 21 by means of recording channel 25. In particular for a magnetoresistive read head, resistance changes are detected in the magnetoresistive material in the read head (as described below), which correspond to changes in magnetic fields representative of data bits recorded in the magnetic storage medium 12 intercepted by the magnetoresistive element.

The above description of a typical magnetic disk storage system, and the accompanying illustration of it in FIG. 1 are for representation purposes only. It should be apparent that disk storage systems may contain a large number of disks and actuator arms, and each actuator arm may support a number of sliders.

Figure 2:
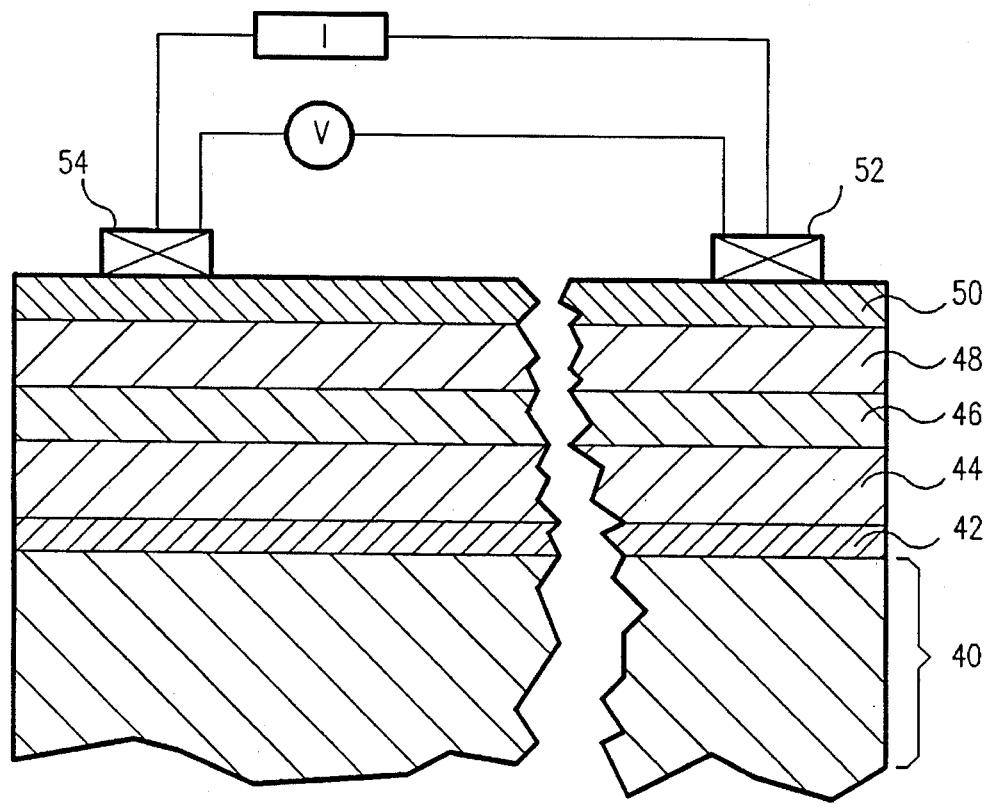
FIG. 2 is a schematic sectional view of a multilayered magnetic structure in accordance with a preferred embodiment of the present invention.

FIG. 2 is a schematic sectional view of a multilayered thin film magnetic structure in accordance with the present invention. Specifically, FIG. 2 illustrates the layered structure of a magnetoresistive read head in proximity to the surface of the magnetic storage medium 12 (which lies in the plane of the figure). As illustrated, the magnetoresistive read head basically comprises a substrate 40 which has a surface layer 42, a magnetic biasing ("soft film") layer 44, a non-magnetic spacer layer 46, a magnetoresistive layer 48, and a capping layer 50. The substrate 40 may include various other sublayers including magnetic shielding layers, insulation layers, etc. These sublayers are collectively referred to as the substrate with respect to those "active" layers of the head (i.e. the soft film magnetic biasing and magnetoresistive layers in the illustrated embodiment) to be deposited thereon. As will become more apparent below, the present invention is directed to providing a surface layer of the substrate which has a stable surface chemistry for the deposition of the adjacent soft film or magnetoresistive alloy layer thereon.

The substrate 40 typically has a layer of Alumina ($Al_2O_3$) or Silica ($SiO_2$) on which the surface layer 42 is formed. It has been known that without the surface layer 42, soft film alloys react with the underlying oxide layer to the extent that the soft film 44 chemical and physical properties are influenced as to affect the performance of the read head. Specifically, without the layer 42, the soft film layer 44 partially oxidizes at its contact surface in the presence of the underlying oxide, which can take place during deposition, during subsequent processing which includes repeated annealing steps at elevated temperatures (e.g. 250 degrees C.), and during operational service lifetime due to Joule heating. This oxidation otherwise changes the chemical and physical properties of the soft film 44 at least at its contact surface facing the oxide layer and consequently adversely affects the performance of the read head.

The surface layer 42 can be of any suitable material which can offer a surface having a stable chemistry with respect to the adjacent alloy. The surface layer should be inert with respect to the soft film layer 44 at temperatures less than about 250 degrees C. As used herein, inertness refers to the absence of chemical reaction and interdiffusion to such an extent which would otherwise adversely change the soft film layer's chemical, microstructural or magnetic properties, with the understanding that all materials interdiffuse and chemically react to some extent.

Preferably, a metal such as Tantalum (Ta) or Chromium (Cr) is deposited onto the Alumina or Silica to form the layer 42. Ta and Cr which are otherwise conductive become highly resistive due to partial oxidation when deposited on the Alumina or Silica. This high resistivity reduces shunting of the sense current in the magnetoresistive layer 48. The surface layer 42 is stable with respect to the soft film layer 44 and further acts as a barrier to protect the soft film from contamination by surface residues. The surface layer 42 can also act as a seed layer to set the soft film magnetization orientation in a well-defined direction, thereby reducing magnetic instability.

The non-magnetic spacer layer 46 magnetically decouples the soft film layer 44 and the magnetoresistive element 48 to allow magnetostatic coupling therebetween when current flows through the soft film. The soft film layer 44 can be any one of NiFeRh, NiFeNb or NiFeCr alloys, or any other material suitable for providing magnetic biasing to the magnetoresistive element 48. The capping layer 50 covers the magnetoresistive layer 48 minimizing or eliminating contamination and corrosion. The spacer layer 46 and capping layer 50 are preferably Ta or Cr which can be the same material as the layer 42, thereby reducing fabrication material costs. The magnetoresistive element 48 can be NiFe or any other suitable material.

Preferably, the thicknesses of the surface layer 42 is 30–50 Å, the soft magnetic layer 44 is on the order of 50–200 Å with the preferred range of 100–175 Å (approximately 60% of the sensor magnetic thickness), the spacer layer 46 is on the order of 60 Å, the magnetoresistive layer 48 is 90–300 Å and the capping layer 50 is on the order of 30 Å.

The layers 42, 44, 46 48 and 50 may be formed in the specified sequence by any conventional processes such as electron beam or sputter deposition, for example, which include appropriate photomasking or photolithography procedures to obtain the desire layered structure of the read head. Electrical leads 52 and 54 are formed on the capping layer 50 which are used to provide constant current through each of the layers in the structure. During operation of the read head 21, the change in voltage across the magnetoresistive layer 48 is measured in response to magnetoresistive changes in the presence of changing magnetic field on the medium 12. Other materials (not shown in FIG. 2) may be overlaid on this basic structure to improve structural integrity of the head. In addition, a write transducer may be formed above the magnetoresistive read head by additional deposition steps, thereby to form an integrated read/write transducer. A wear resistant coating (not shown in FIG. 2) may be provided on the air-bearing surface of the head which faces the medium 12. Finally, the head may be finished by appropriate lapping or ion milling procedures to obtained the desired external structure.

It is noted that the soft film layer 44 and the magnetoresistive layer 48 may be interchanged in the layered structure and still take advantage of the present invention. In such configuration, the layer 42 prepares the surface of the substrate 40 prior to deposition of the magnetoresistive material.

By providing a surface layer 42 such as oxidized Ta or Cr, the subsequent layer of alloy, such as the soft film NiFeCr, would be physically shielded from the substrate. The soft film layer therefore substantially remains stable with respect to the substrate, which eliminates the non-systematic variation in the property of the soft film. Consequently, non-systematic variations in asymmetry characteristics between magnetoresistive read heads manufactured are reduced.

while the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

I claim:

1. A magnetoresistive read transducer comprising:

a substrate having a top layer of $Al_2O_3$ or $SiO_2$ thereon;

a surface layer of partially oxidized chromium or tantalum deposited over and contiguous with the top layer of $Al_2O_3$ or $SiO_2$, the surface layer material having a high resistivity;

a bias layer of soft magnetic material on said surface layer;

a layer of magnetoresistive material magnetically decoupled from and magnetostatically coupled to the soft magnetic material such that the soft magnetic material magnetically biases the magnetoresistive material, the layer of magnetoresistive material separated from said bias layer by a nonmagnetic spacer layer, and the material of said surface layer characterized by being substantially inert with respect to the soft magnetic material to provide a well defined surface for formation of said bias layer.

2. A magnetoresistive read transducer as in claim 1 wherein said bias layer is of a soft magnetic material selected from the group consisting of NiFeCr, NiFeNb and NiFeRh.

3. A magnetoresistive read transducer as in claim 1 wherein said layer of magnetoresistive material comprises an alloy of NiFe.

4. A magnetoresistive read transducer as in claim 1 further comprising a capping layer deposited over said layer of magnetoresistive material.

5. A magnetic transducer having a multilayered structure which includes a substrate having a top layer of $Al_2O_3$ or $SiO_2$ thereon, layers of first and second magnetic alloys respectively formed thereon which are magnetostatically coupled, the first magnetic alloy layer being formed on the substrate, the first and second magnetic alloy layers separated by a nonmagnetic spacer layer, the improvement comprising a surface layer of partially oxidized chromium or tantalum contiguous with the top layer of $Al_2O_3$ or $SiO_2$ below the layer of the first magnetic alloy, said surface layer of material characterized by a high resistivity and being substantially inert with respect to the first magnetic alloy to provide a well defined surface for the forming of the first magnetic alloy layer.

6. A magnetic transducer as in claim 5 wherein the first magnetic alloy is a soft magnetic material and the second magnetic alloy is a magnetoresistive material.

7. A magnetic transducer as in claim 6 wherein said first magnetic alloy is selected from the group consisting of NiFeCr, NiFeNb and NiFeRh.

8. A magnetic transducer as in claim 6 wherein said second magnetic alloy comprises an alloy of NiFe.

* * * * *

UNITED STATES PATENT AND TRADEMARK OFFICE
CERTIFICATE OF CORRECTION

PATENT NO. : 5,591,533
DATED : January 7, 1997
INVENTOR(S) : Mustafa Pinarbasi

It is certified that error appears in the above-indentified patent and that said Letters Patent is hereby corrected as shown below:

Column 1, Line 5, "of application of application" should be --of application--.
Column 5, Line 31, "while" should be --While--.

Signed and Sealed this

Fourteenth Day of October, 1997

*Attest:*

BRUCE LEHMAN

*Attesting Officer*  *Commissioner of Patents and Trademarks*